US010177910B2

(12) United States Patent
Kinshumann et al.

(10) Patent No.: US 10,177,910 B2
(45) Date of Patent: Jan. 8, 2019

(54) PRESERVING PROTECTED SECRETS ACROSS A SECURE BOOT UPDATE

(71) Applicant: Microsoft Technology Licensing, LLC, Redmond, WA (US)

(72) Inventors: Kinshumann, Redmond, WA (US); Christopher McCarron, Hartford, CT (US); Yevgeniy Anatolievich Samsonov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 15/253,521

(22) Filed: Aug. 31, 2016

(65) Prior Publication Data
US 2018/0062833 A1    Mar. 1, 2018

(51) Int. Cl.
*H04L 9/08* (2006.01)
*G06F 11/14* (2006.01)
*G06F 21/57* (2013.01)

(52) U.S. Cl.
CPC .......... *H04L 9/085* (2013.01); *G06F 11/1417* (2013.01); *G06F 11/1433* (2013.01); *G06F 21/572* (2013.01); *G06F 21/575* (2013.01); *H04L 2209/127* (2013.01)

(58) Field of Classification Search
CPC . H04L 9/085; H04L 2209/127; G06F 21/575; G06F 11/1433; G06F 11/1417; G06F 21/572
See application file for complete search history.

(56) References Cited

U.S. PATENT DOCUMENTS

| 7,809,957 | B2 | 10/2010 | Grawrock | |
|---|---|---|---|---|
| 2003/0196083 | A1 | 10/2003 | Grawrock | |
| 2003/0200450 | A1* | 10/2003 | England | G06F 21/6218 713/189 |
| 2003/0233644 | A1* | 12/2003 | Cohen | G06F 8/60 717/171 |
| 2006/0095505 | A1* | 5/2006 | Zimmer | G06F 21/57 709/203 |

(Continued)

FOREIGN PATENT DOCUMENTS

WO    2012060683 A1    5/2012

OTHER PUBLICATIONS

"International Search Report and the Written Opinion issued in PCT Application No. PCT/US2017/048517," dated Nov. 7, 2017.

(Continued)

*Primary Examiner* — Michael Pyzocha
(74) *Attorney, Agent, or Firm* — Workman Nydegger

(57) ABSTRACT

Obtaining a sealed secret. The method includes decrypting one or more BLOBs at a computing system from among a plurality of different BLOBs. Each of the BLOBs in the plurality of BLOBs contains the secret. Each of the BLOBs in the plurality of BLOBs is sealed to a different condition from among a plurality of conditions. A given condition is a reflection of a system state where the system state is indicative of whether or not the system can be trusted to receive the secret. The method further includes evaluating one or more of the conditions to determine if at least one of the one or more conditions is met. The method further includes, if at least one of the one or more conditions is met, then providing the secret to an external entity.

20 Claims, 5 Drawing Sheets

(56) References Cited

U.S. PATENT DOCUMENTS

| | | | |
|---|---|---|---|
| 2006/0155988 A1* | 7/2006 | Hunter | G06F 21/575 713/164 |
| 2006/0161790 A1 | 7/2006 | Hunter et al. | |
| 2007/0226505 A1* | 9/2007 | Brickell | G06F 21/57 713/176 |
| 2008/0144825 A1 | 6/2008 | Dias et al. | |
| 2008/0229114 A1* | 9/2008 | Okabe | G06F 21/57 713/189 |
| 2008/0282348 A1* | 11/2008 | Proudler | G06F 21/57 726/22 |
| 2010/0106734 A1* | 4/2010 | Calder | G06F 17/30011 707/758 |
| 2010/0268967 A1* | 10/2010 | Senda | G06F 21/575 713/193 |
| 2010/0303240 A1 | 12/2010 | Beachem et al. | |
| 2011/0099627 A1* | 4/2011 | Proudler | G06F 21/57 726/21 |
| 2011/0185165 A1 | 7/2011 | Haga et al. | |
| 2013/0013928 A1* | 1/2013 | Thom | G06F 21/31 713/182 |
| 2013/0061056 A1 | 3/2013 | Proudler et al. | |
| 2013/0086383 A1* | 4/2013 | Galvao de Andrade | H04L 9/0897 713/171 |
| 2014/0066040 A1* | 3/2014 | Zeng | H04W 4/50 455/418 |
| 2014/0068276 A1 | 3/2014 | Imamoto | |
| 2015/0134965 A1 | 5/2015 | Morenius | |
| 2015/0172054 A1* | 6/2015 | Prakash | G06F 21/44 713/189 |
| 2015/0319160 A1* | 11/2015 | Ferguson | H04L 9/0894 726/10 |
| 2015/0358301 A1* | 12/2015 | Dalbehera | H04L 63/061 713/171 |
| 2016/0140343 A1 | 5/2016 | Novak et al. | |

OTHER PUBLICATIONS

Corbet, Jonathan, "Protecting systems with the TPM", Published on: Feb. 9, 2016 Available at: https://lwn.net/Articles/674751/.

Slonosky, Mike, "Data Protection with the QorIQ™ Platform T2080 Trust Architecture", In Technology White Paper of Curtis-Wright, Retrieved on: Jun. 23, 2016, pp. 1-7.

\* cited by examiner

PRESERVING PROTECTED SECRETS ACROSS A SECURE BOOT UPDATE

BACKGROUND

Background and Relevant Art

Modern computer systems have needed to necessarily provide security for the computer systems. Viruses and other methods have been used to compromise computing systems. As such, countermeasures have been implemented to prevent or reduce the effectiveness of attacks.

One type of protection relates to protection provided by trusted platform modules (TPMs). TPMs provide functionality for protecting hardware devices by integrating cryptographic keys directly into the hardware devices. In a simplified example, a TPM may store a secret, such as a decryption key. The secret may be used to unlock secret data. For example, the hard drive on a computer may be encrypted to the secret to prevent compromising secret data on the hard drive.

The secret may be sealed. Sealing means that the secret is encrypted in a fashion that requires the TPM to enable decryption, and the TPM providing the secret to external entities is tied to a condition. Thus, the TPM will only decrypt and/or provide the secret if certain conditions are met. In other words, sealing generally is defined as encrypting to a condition whereas unsealing includes decrypting and enforcing the condition.

The condition, in TPMs, is often related to hardware or operating system integrity. For example, in a boot process, various entities perform various functions serially. Thus, an entity (e.g., a boot module) will do an integrity check, and if the integrity check passes, the entity will perform certain functions and pass processing on to the next entity in the process. The next entity will perform an integrity check, and further pass on processing to yet another entity. This continues until all entities have passed integrity checks and performed desired processing. The processing or integrity checks may be accumulated along the way, such as by iterative appending and hashing processes with the results stored in a check register. At the end of processing, the check register will have a computed condition value. This condition value can be compared to the known good condition value. The known good condition value may have been generated during a known good boot process. If these two values match, the secret is decrypted and provided to an external entity. Thus for example, the operating system may obtain the secret to decrypt the hard drive and allow the computing system to be used.

However, if the condition values do not match (usually an indication that an entity has been tampered with), the secret will not be released by the TPM. This is the desired result typically. However, if boot entities are updated by a legitimate process, this will nonetheless result in mismatch between a computed condition value and a known good condition value. This will cause the secret to be maintained by the TPM such that the hard drive, in the illustrated example, will not be able to be decrypted resulting in the computing system being essentially unusable, in spite of the system not being compromised, unless the known condition value can be updated.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method of obtaining a sealed secret. The method includes decrypting one or more BLOBs at a computing system from among a plurality of different BLOBs. Each of the BLOBs in the plurality of BLOBs contains the secret. Each of the BLOBs in the plurality of BLOBs is sealed to a different condition from among a plurality of conditions. A given condition is a reflection of a system state where the system state is indicative of whether or not the system can be trusted to receive the secret. The method further includes evaluating one or more of the conditions to determine if at least one of the one or more conditions is met. The method further includes, if at least one of the one or more conditions is met, then providing the secret to an external entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein can allow a sealed secret, such as a key, to be provided, even when a condition related to the sealing is not met. This can be done by sealing the secret into a plurality of different binary large object (BLOBs), each of the BLOBs being sealed to a different condition. Thus, so long as one of the conditions is met, the secret can be provided from the BLOB associated with that condition. As such, different updates can be implemented that affect system conditions, thus affecting calculated system condition values, but so long as at least one known condition value matches a calculated condition value, the secret can still be unsealed and provided.

Additionally, when the calculated condition values do not match known condition values, this can be used as an indicator that known condition values may need to be updated due to a system update, and/or that system updates should be evaluated to determine if the system updates are valid.

In some cases known system values may be updated automatically to non-matching calculated condition values so long as at least one known condition value matches one calculated condition value.

However, it should be appreciated that the known condition values are not necessarily automatically updated. In particular, sometimes an update may be evaluated as a result of identifying a known condition value and calculated condition value mismatch to ensure that the update is trusted or otherwise valid.

Figure 1:
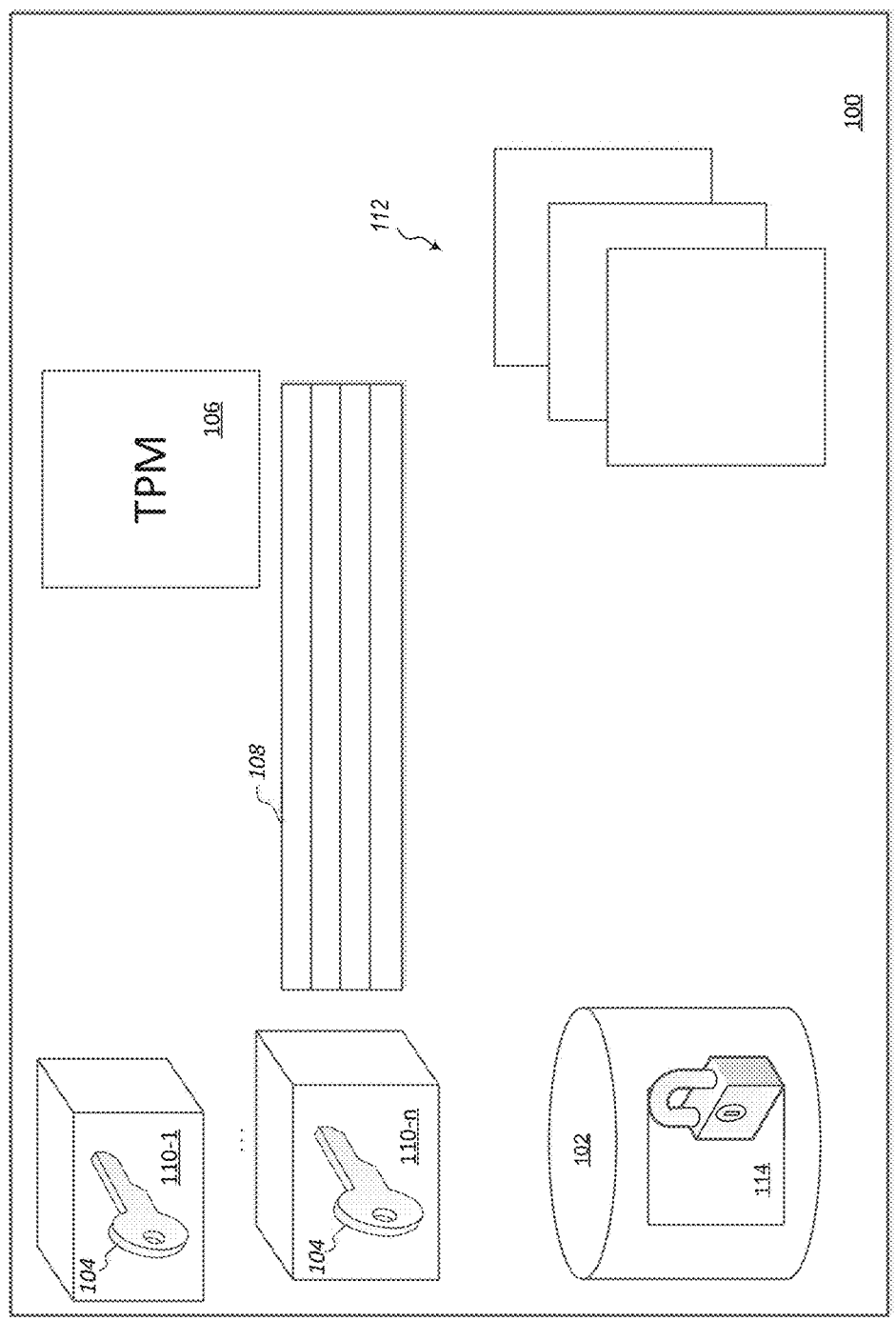
FIG. 1 illustrates a device supporting measured boot operations.

Detailed examples are now illustrated with reference to FIG. 1.

Where a computing device 100 implements support for measured boot (for example, as defined in the TCG specification), it is then possible to utilize code integrity means for the purpose of protecting secret data 114 from un-authorized disclosure in-between system reboots. This is achieved by first encrypting the secret data 114, such data in a datastore 102, with a secret 104, e.g., a random symmetric key (a data protection key) and then further sealing the secret with the system Trusted Platform Module (TPM) 106 using what is commonly referred to as a "sealing" operation. A set of TPM Platform Configuration Registers (PCRs) 108 is used to enforce the system state at the time of the subsequent decryption, and the TPM 106 will not release the secret 104 should any one of the chosen PCRs in the set of PCRs 108 not match the expected value. As the TPM PCRs 108 contain the chained or accumulated hash value of all loaded modules and also the boot process configuration, this method guarantees that the secret 104 will only be released if the computing device has booted into the same state as was intended by the sealing operation. As noted, any change to configuration and/or to any loaded module will result in a changed PCR value, and will hence prevent a release of the secret 104 by the TPM 106 during the boot cycle if only a single sealing operation is used. However, in some embodiments illustrated herein, multiple sealing operations or multiple sealed BLOBs, such as BLOBs 110-1 through 110-n containing the secret 104 can be used to increase the chances that the secret 104 can be provided.

Where a computing device 100 also implements support for secure boot (per UEFI specification), it is then possible to limit the set of TPM PCRs used for protecting secret data. For example, embodiments may limit the registers to just those containing the configuration data of the Secure boot databases. Alternatively or additionally embodiments may limit the registers to just those containing the signing authority of the modules being loaded. This allows for any updates to the modules 112 being launched during a particular boot cycle for as long as those modules 112 are still signed by the same original authority targeted by the seal operation. Alternatively or additionally embodiments may facilitate embodiments where the content of secure boot databases themselves is getting updated (while still allowing for the secret 104 to be provided), which is a rare but a very important operation used to keep the databases up-to-date with a known list of malicious modules and signers.

Embodiments facilitate preserving the secret 104 protected by TPM sealing across an update to secure boot database content. In the illustrated example, the secret data in the datastore 104 is encrypted with a secret 104, which in this case is a random symmetric key (a data protection key or DPK), and the secret 104 is sealed with a TPM 106 using a first condition, which in this case is reflected by a subset of the set of PCRs 108 reflecting the state of secure boot and module signers. Additionally, in the illustrated example, embodiments create an additional sealed BLOB containing the data protection key sealed to a set of PCRs 108 reflecting the hashes of the modules being loaded, but not including the state of secure boot. While two sealed BLOBs 110-1 and 110-n are illustrated in this example, it should be appreciated that in other embodiments additional sealed BLOBs may be created using different conditions.

Figure 2:
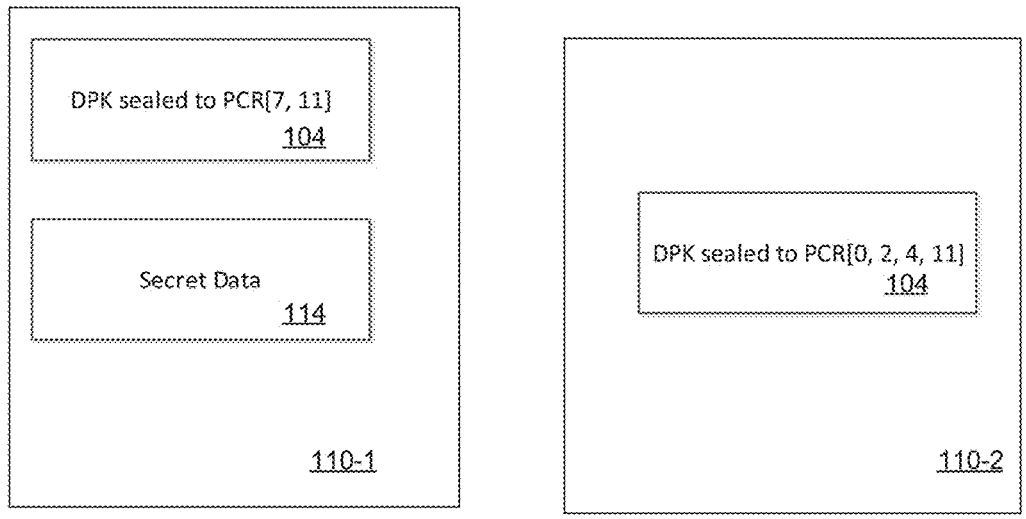
FIG. 2 illustrates different BLOBs scaling the same secret to different conditions.

In an illustrated example illustrated in FIG. 2, when unsealing the secret 104 the original sealed BLOB 110-1 is tried first. Where this step succeeds the secret 104 is then available right away. The back-up sealed BLOB 110-2 is verified for its target PCR values to still match the current boot cycle to determine whether the sealing for the back-up BLOB 110-2 needs to be updated or not. Where the back-up PCR values do not match the current cycle, this indicates that one or more modules have been updated while still being signed by the same authority, and the back-up sealed BLOB 110-2 is then updated to reflect the accumulated hash of the currently loaded modules. Where the original sealed BLOB 110-1 fails to unseal, this indicates a potential change to the secure boot configuration, and the back-up BLOB 110-2 is then tried. As long as the same set of modules is being loaded during the boot cycle, the back-up BLOB 110-1 will unseal successfully, releasing secret 104, e.g., the data protection key, and this allows decrypting the secret data 114. The original sealed BLOB 110-1 is then updated to reflect the new configuration of secure boot databases. As long as the secure boot database content is updated separately from any modules used as part of protecting secret data 114, this will allow preservation of secret data 114 across an update to the secure boot configuration.

Thus, embodiments can be configured to create and maintain a data BLOB containing a secret 104, such as a data protection key for secret data 114 and sealed to a condition, such as the state of a set of PCRs 108 not including the secure boot configuration state, but including an accumulated hash of loaded modules to serve as a back-up protector for the original BLOB containing the same data protection key sealed to one or more other conditions, such as the state of a set of PCRs 108 reflecting the secure boot configuration state and module signers, but not including an accumulated hash of loaded modules.

Embodiments may include functionality for updating sealed BLOBs to always reflect a condition, such as in the case of the back-up BLOB 110-2 shown above, an accumulated hash of loaded modules in the current boot cycle.

In the illustrated example, embodiments may use a back-up sealed BLOB 110-2 to unseal the secret 104 (e.g., the data protection key) when the original sealed BLOB 110-1 fails to unseal because of changes to secure boot state or other conditions.

Embodiments may update an original sealed BLOB 110-1 after having used the back-up BLOB 110-2 to unseal the secret 104.

In the example illustrated in FIG. 2, the secret data 114 is encrypted with a secret 104 which is, in this example, a random symmetric Data Protection Key (DPK), and the DPK is then sealed to 2 different sets of TPM PCRs: the master sealed BLOB 110-1 contains encrypted secret data 114 (although the encrypted secret data 114 may be stored in other locations alternatively or additionally) along with a DPK sealed to PCRs 7 and 11, while the back-up sealed BLOB contains the same DPK sealed to PCRs 0, 2, 4 and 11, in the example illustrated in FIG. 2. Per measured boot TCG specification and UEFI specification, PCR 7 reflects the configuration of secure boot on the device, while PCR 4 contains the accumulated hash of the boot manager module. The rest of the PCRs are used for other purposes which are not covered here. Each of the two sealed BLOBs also includes the target accumulated hash value, i.e., the computed condition value of its respective PCR set.

Figure 3:
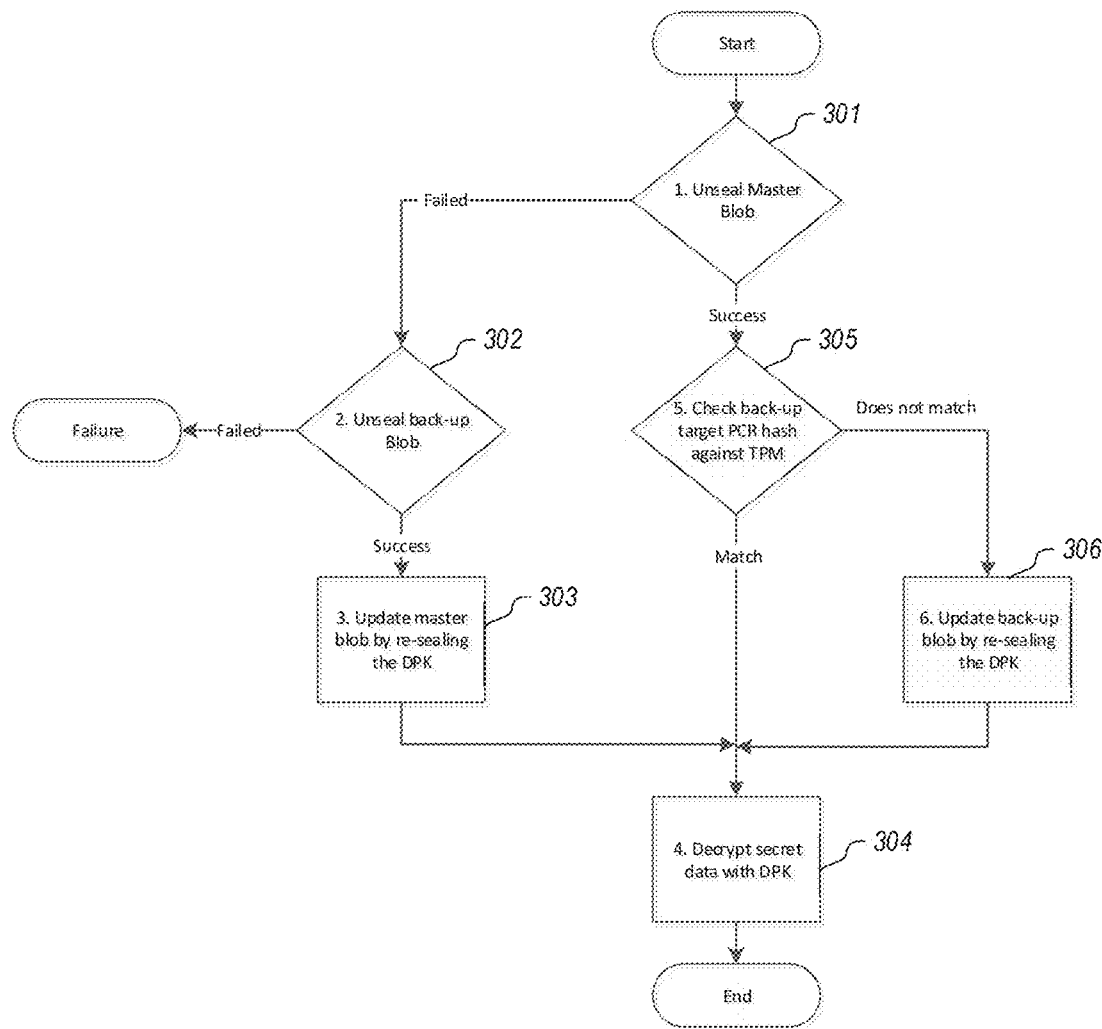
FIG. 3 illustrates a flow chart illustrating how a secret can be sealed when system changes occur.

FIG. 3 illustrates a flowchart showing the steps, for one specific embodiment, performed to preserve the secret data 114 across a change to secure boot configuration. At the point of execution where secret data 114 needs to be obtained, the control will first try to unseal the DPK using the master BLOB (as illustrated at 301). If secure boot configuration has changed since the last boot cycle then this step is expected to fail, and the control will then try to unseal the DPK using the back-up BLOB (as illustrated at 302). A failure at this step indicates that both the secure boot configuration and the boot manager module have changed since the last boot cycle, and this results in a failure to preserve the secret data 114. Although in other embodiments, additional BLOBs may be used to increase the probability that the secret data 114 can be recovered.

However, in the present example, where the boot manager module has not changed since the last boot cycle, this step will succeed and will provide the DPK. The control is then passed to step 303 where the Master BLOB 110-1 is updated by resealing the DPK just obtained against the present values of PCRs 7 and 11. The control is then passed to step 304 where the DPK just obtained is used to decrypt the secret data 114, which is now available for the current and future boot cycles.

Where the master BLOB 110-1 succeeded to unseal at step 301, the next step is then to check the target PCR accumulated hash value of the back-up BLOB against the current TPM PCRs (as illustrated at 305) and to update the back-up BLOB by re-sealing the DPK should the target PCR accumulated hash value not match the current TPM PCRs 108 (indicating that the boot manager module has likely been updated since the last boot cycle) (as illustrated at 306). The control is then passed to step 304 where the DPK obtained in step 301 is used to decrypt the secret data.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
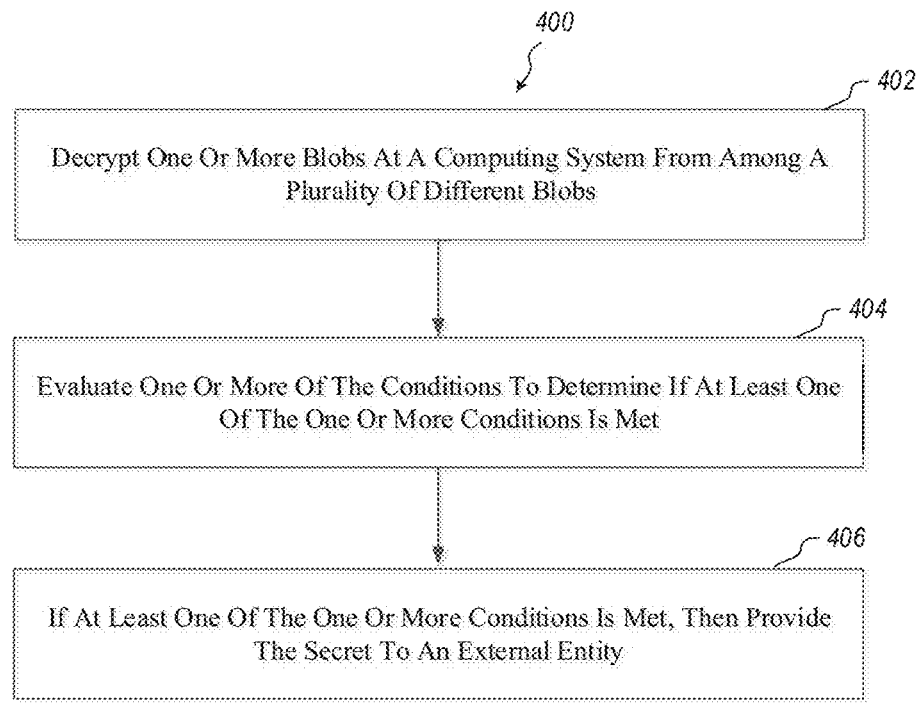
FIG. 4 illustrates a method of obtaining a secret.

Referring now to FIG. 4, a method 400 is illustrated. The method 400 is a computer implemented method of obtaining a sealed secret. The method includes decrypting one or more BLOBs at a computing system from among a plurality of different BLOBs (act 402). Each of the BLOBs in the plurality of BLOBs contains the secret. Each of the BLOBs in the plurality of BLOBs is sealed to a different condition from among a plurality of conditions. A given condition is a reflection of a system state where the system state is indicative of whether or not the system can be trusted to receive the secret. For example, such system state may include a list of signers of a BLOB or of a system component. Alternatively or additionally, system state may include a set of operating system components.

The method 400 further includes evaluating one or more of the conditions to determine if at least one of the one or more conditions is met (act 404). In some embodiments, this may be done by unsealing the BLOB as described above. For example, an accumulated hash value may be computed and compared with a previously obtained accumulated hash value.

If at least one of the one or more conditions is met, then the method further includes providing the secret to an external entity (act 406). For example, a key may be unlocked that allows an encrypted hard drive to be unlocked. The key may be provided to the operating system which is an entity external to the TPM. Another example may include unlocking a key which is used to decrypt a particular media stream on the device, such as a media stream provided from a commercial streaming media provider, such as various video on demand providers.

The method 400 may further include, as a result of determining that at least one of the one or more conditions is not met, then determining if one or more of the BLOBs needs to be updated. For example, a valid change to operating system components may result in one of the conditions not matching a previously known condition. The condition could then be updated to reflect this change and the secret resealed to the updated condition.

The method 400 may further include, determining to not update a BLOB for which a corresponding condition is not met as a result of determining that changes at the computing system causing the condition to not be met are unacceptable changes. For example, a determination may be made that changes to an operating system are not allowed or that certain signatures are not sufficient. Embodiments can prevent resealing to the updated condition if the condition will be required to be rolled-back anyway.

The method 400 may further include, as a result of determining that at least one of the one or more conditions is not met, then updating one or more of the BLOBs associated with conditions that are not met. Thus, for example, when one condition is met allowing the secret to be provided, but another condition is not met, the condition that is not met may be updated such that the condition will be met and the secret resealed to the updated condition.

The method 400 may be practiced where at least one of the conditions relates to a list of signers, such as for example, signing authorities of modules being loaded into an operating system. Alternatively or additionally, the method 400 may be practiced where at least one of the conditions relates to a list of operating system components.

The method 400 may further include, updating conditions for a plurality of the BLOBs. In some such embodiments, updating the conditions is done iteratively, such that two or more different conditions are updated with intervening reboot operations between updating conditions. Alternatively or additionally, the method 400 may further include, determining that updates have been requested to all of the conditions in the plurality of conditions without an intervening reboot operation and as a result declining to perform at least one update to one condition. In particular, updates are performed such that all conditions are changed, on the next reboot, there will be no conditions that can be met to allow the secret to be obtained. Thus, some embodiments may prevent all conditions from being changed without an intervening reboot between at least two of the conditions. The reboot will allow the changed conditions to be updated while still being able to recover the secret based on one or more unchanged conditions. Once the reboot has occurred and the changed conditions have been updated, then the unchanged conditions can be changed, but the secret could still be recovered because the previously changed conditions would have been updated to allow the conditions to be met.

Figure 5:
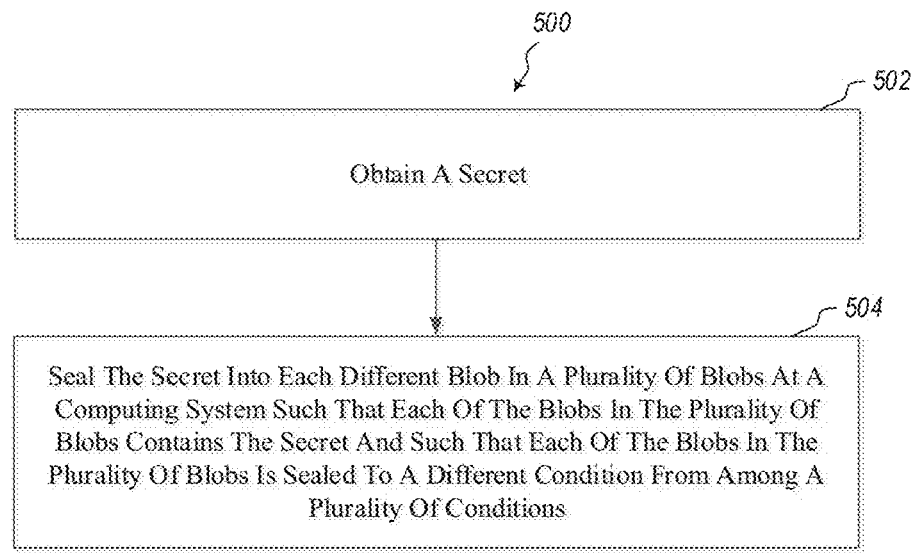
FIG. 5 illustrates a method of sealing a secret.

Referring now to FIG. 5, a computer implemented method 500 of sealing a secret is illustrated. The method 500 includes obtaining a secret (act 502). For example, in some embodiments, a hard drive of a computing system may be encrypted to a decryption key. The decryption key may be the secret. The decryption key may be provided to a TPM.

The method 500 may further include sealing the secret into each different BLOB in a plurality of BLOBs at a computing system such that each of the BLOBs in the plurality of BLOBs contains the secret and such that each of the BLOBs in the plurality of BLOBs is sealed to a different condition from among a plurality of conditions (act 504). A given condition is a reflection of a system state. The system state is indicative of whether or not the system can be trusted to receive the secret.

The method 500 may further include, as a result of determining that at least one of the one or more conditions has changed, then updating one or more of the BLOBs associated with conditions that have changed.

The method 500 may be practiced where at least one of the conditions relates to a list of signers. Alternatively or additionally, the method 500 may be practiced where at least one of the first condition and second condition relates to a list of operating system components.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system enabled to preserve protected secrets across a secure boot update, the system comprising:
   one or more processors; and
   one or more computer-readable storage devices having stored thereon instructions that are executable by the one or more processors to configure the computer system to obtain a sealed secret, including instructions that are executable to configure the computer system to perform at least the following:
      maintaining a plurality of binary large objects (BLOBs), each BLOB in the plurality of BLOBs containing the encrypted data and the sealed secret, each sealed secret in each BLOB having been sealed to a different condition, each condition being a reflection of a system state indicative of whether or not the system can be trusted to receive the secret;
      attempting to unseal the sealed secret contained in a first BLOB using a first condition:
      based on the attempt to unseal the sealed secret contained in the first BLOB being successful, determining whether a second BLOB needs to be updated and, if so, update the second BLOB;
      based on the attempt to unseal the sealed secret contained in the first BLOB being unsuccessful, attempt to unseal the sealed secret contained in the second BLOB using a second condition; and
      based on either the attempt to unseal the sealed secret contained in the first BLOB or the attempt to unseal the sealed secret contained in the second BLOB being successful, providing the unsealed secret to an entity, the unsealed sealed secret enabling the entity to access the encrypted data.

2. The computing system of claim 1, wherein it is determined that one or more of the BLOBs needs to be updated and, as a result, at least one BLOB is updated.

3. The computing system of claim 2, wherein the one or more computer-readable storage devices further have stored thereon instructions that are executable by the one or more processors to configure the computer system to determine to not update a BLOB for which a corresponding condition is not met as a result of determining that changes at the computing system causing the condition to not be met are unacceptable changes.

4. The computing system of claim 1, wherein the one or more computer-readable storage devices further have stored thereon instructions that are executable by the one or more processors to configure the computer system to, as a result of determining that at least one of the conditions is not met, then update one or more of the BLOBs associated with conditions that are not met.

5. The computing system of claim 1, wherein at least one of the conditions relates to a list of signers.

6. The computing system of claim 1, wherein at least one of the first condition and second condition relates to a list of operating system components.

7. The computing system of claim 1, wherein the one or more computer-readable storage devices further have stored thereon instructions that are executable by the one or more processors to configure the computer system to update conditions for multiple of BLOBs of the plurality of BLOBs, and wherein updating the conditions is done iteratively, such that two or more different conditions are updated with intervening reboot operations between updating conditions.

8. The computing system of claim 1, wherein the one or more computer-readable storage devices further have stored thereon instructions that are executable by the one or more processors to configure the computer system to determine that updates have been requested for a plurality of conditions without an intervening reboot operation and, as a result, decline to perform at least one update to one condition.

9. A computer implemented method of obtaining a sealed secret, the method comprising:
   accessing one or more binary large objects (BLOBs) at a computing system from among a plurality of different BLOBs, wherein each of the BLOBs in the plurality of BLOBs contains the secret, wherein each of the BLOBs in the plurality of BLOBs is sealed to a different condition from among a plurality of conditions, and wherein a given condition is a reflection of a system state where the system state is indicative of whether or not the system can be trusted to receive the secret;
   attempting to unseal the sealed secret contained in a first BLOB using a first condition;
   based on the attempt to unseal the sealed secret contained in the first BLOB being successful, determining whether a second BLOB needs to be updated and, if so, update the second BLOB;
   based on the attempt to unseal the sealed secret contained in the first BLOB being unsuccessful, attempt to unseal the sealed secret contained in the second BLOB using a second condition; and
   based on either the attempt to unseal the sealed secret contained in the first BLOB or the attempt to unseal the sealed secret contained in the second BLOB being successful, providing the unsealed secret to an entity, the unsealed sealed secret enabling the entity to access encrypted data.

10. The method of claim 9, further comprising as a result of determining that at least one of the plurality of conditions is not met, then determining if one or more of the plurality of BLOBs needs to be updated.

11. The method of claim 10, further comprising determining to not update a BLOB for which a corresponding condition is not met as a result of determining that changes at the computing system causing the condition to not be met are unacceptable changes.

12. The method of claim 9, further comprising, as a result of determining that at least one of the plurality of conditions is not met, then updating one or more of the BLOBs associated with conditions that are not met.

13. The method of claim 9, wherein at least one of the conditions relates to a list of signers.

14. The method of claim 9, wherein at least one of the first condition and second condition relates to a list of operating system components.

15. The method of claim 9, further comprising updating conditions for multiple BLOBs of the plurality of BLOBs, and wherein updating the conditions is done iteratively, such that two or more different conditions are updated with intervening reboot operations between updating conditions.

16. The method of claim 9, further comprising determining that updates have been requested to all of the conditions in the plurality of conditions without an intervening reboot operation and as a result declining to perform at least one update to one condition.

17. A computer implemented method of sealing a secret, the method comprising:
   obtaining a secret; and
   sealing the secret into a first Binary Large Object (BLOB) of a plurality of BLOBs at a computing system such that the first BLOB contains the secret and such that the first BLOB is sealed to a first condition of a plurality of conditions, wherein each condition of the plurality of conditions is a reflection of a system state indicative of whether or not the system can be trusted to receive the secret; and sealing the secret into a second Binary Large Object (BLOB) of the plurality of BLOBs such that the second BLOB contains the secret and such that the first BLOB is sealed to a second condition of the plurality of conditions.

18. The method of claim 17, further comprising, as a result of determining that at least one of the plurality of conditions has changed, then updating one or more of the plurality of BLOBs associated with the at least one changed condition.

19. The method of claim 17, wherein at least one of the conditions relates to a list of signers.

20. The method of claim 17, wherein at least one of the first condition and second condition relates to a list of operating system components.

\* \* \* \* \*